Sept. 14, 1954    F. G. LOGAN ET AL    2,688,879
POWER TRANSMISSION
Filed Oct. 21, 1950
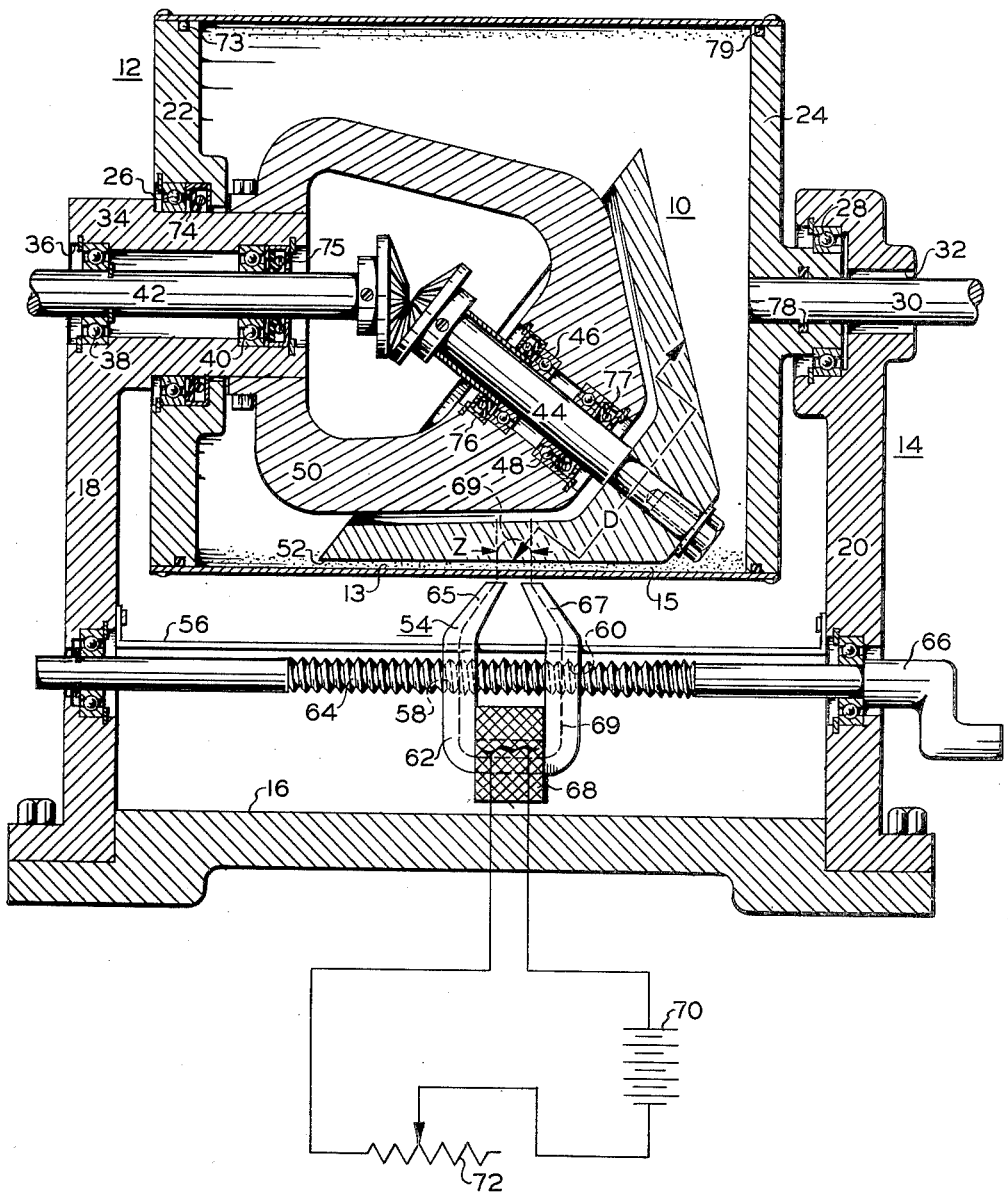
INVENTOR.
FRANK G. LOGAN
PHILIP H. TRICKEY
BY
*Ralph L. Tweedale*
ATTORNEY Patented Sept. 14, 1954

2,688,879

UNITED STATES PATENT OFFICE 2,688,879

POWER TRANSMISSION

Frank G. Logan, Kirkwood, and Philip H. Trickey, Webster Groves, Mo., assignors to Vickers Incorporated, Detroit, Mich., a corporation of Michigan Application October 21, 1950, Serial No. 191,382

14 Claims. (Cl. 74—191)

This invention relates to power transmissions and more particularly to variable speed magnetic drives.

Heretofore, changes in output speed from magnetic drives, such as magnetic particle clutches with a fixed speed input, have been obtained by changing the slip between the coupling members of the clutch. This is, of course, productive of power loss and raises the problem of heat dissipation. In addition it is impossible to obtain a torque multiplication with a conventional magnetic clutch.

This invention contemplates a magnetic particle variable drive in which speed variation is obtained by changing the ratio between the effective diameters of the coupling members, the change being effected by selectively magnetizing the magnetic particles in any one of a plurality of coupling zones between the coupling members, at least one of which has a diameter differing from zone to zone. In addition torque multiplication may be obtained from a magnetic drive embodying features of the invention.

It is, therefore, an object of this invention to provide a new and useful magnetic coupling device.

It is another object of this invention to provide a new and useful variable speed magnetic drive.

Another object of the invention is to provide a magnetic torque converter.

Further objects and advantages of the present invention will be apparent from the following description, reference being had to the accompanying drawing wherein the single figure is a view partly in section illustrating a preferred form of the present invention.

In accordance with one embodiment of the invention, a variable magnetic drive is provided with a pair of relatively rotatable coupling members, at least one of which has a varying diameter in order that its effective coupling diameter at the coupling zone may be varied to change the coupling ratio between the members. For example, a rotatable magnetic cone 10 and a rotatable cylinder 12 may be arranged as shown in the drawing with magnetic particles 13 disposed in the gap 15 between the cone and the inner surface of the cylinder wall. "Point" coupling between the cylinder and the cone can be made at any point on the cone along the line from its apex to its base by setting up a concentrated magnetic field at any selected point or zone, thus to take advantage of a particular ratio between the diameter of the cylinder and the cone at any particular point along this line. The diameter of the cone surface varies along the line while the diameter of the cylinder surface is constant. An infinite number of circles of progressively varying diameter form the surface of the cone while the cylinder surface is formed from an infinite number of circles of the same diameter. Thus at least one of the coupling members has a plurality of different effective coupling diameters in order that any one of a plurality of progressively different ratios between the coupling members may be effected.

As shown in the drawing, the apparatus is provided with a frame 14 having a base 16 and end uprights 18 and 20, which with the aid of bearings carry rotating parts of the apparatus.

The cylinder 12 is mounted on and substantially closed by circular end plates 22 and 24 carried for rotation by bearings 26 and 28 mounted on the uprights 18 and 20, respectively. The shaft 30 is fixed to the center of the end plate 24 and freely passes through an aperture 32 provided therefor in the upright 20.

The head 34 at the upper end of the upright 18 is provided with a bore 36 in which a pair of bearings 38 and 40 are fixed in spaced relation to carry a shaft 42 geared to a shaft 44 journaled in bearings 46 and 48 carried by a stationary arbor 50 secured to the head 34 of the upright 18. The cone coupling member 10 is centered and secured to the end of the shaft 44. The apex angle of the cone and the angle of the shaft 44 should be such that a substantially uniform gap 15 is provided between the inner periphery of the cylinder 12 and the slant line 52 of the cone 10 along a line extending from the apex of the cone to its base through points on the cone nearest the cylinder wall. The line will be substantially parallel to the axis of the cylinder 12.

A magnetic field may be selectively directed across the gap 15 at any desired "point" or zone by any suitable means, for example the "horseshoe" electromagnet 54 mounted between parallel guide rails 56 (only one shown) and selectively movable by a screw arrangement including threaded apertures 58 and 60 in the magnet core 62 and a long screw 64 journaled for free rotation in the uprights 18 and 20 and threaded through the apertures 58 and 60. Selective positioning of the magnet 54 is effected by turning the screw 64 with a crank 66 at the end thereof.

The magnet 54 is provided with opposing poles 65 and 67, whose faces are immediately adjacent the cylinder 12, the space between the pole faces and the cylinder being as small as possible compared to the distance between the poles in order to avoid magnetic leakage and to reduce the reluctance of the magnetic path 69 extending from one pole through the cylinder wall to the cone and again through the cylinder wall to the other pole. Excitation for the magnet 54 is provided by a winding 68 connected to a source of current such as a battery 70 through a variable current control 72.

To avoid excessive magnetic leakage and shunting effects, certain of the parts are preferably made of non-magnetic materials. For example, the end plates 22 and 24, the guide rail 56 and the screw 64 may be made of brass, aluminum or some other non-magnetic material. In order to cross the gap 15 the magnetic circuit 69 is completed by a mass of magnetic material on one side of the gap 15, for example the cone 10, and by magnet 54 on the other side of gap 15. The cylinder wall is relatively thin and preferably made of magnetic material. Thin magnetic material will rapidly saturate at low flux values to act as a saturable bridge with very little shunting effect on the magnetic circuit.

The magnetic particles 13 may be of any suitable material, for example ferromagnetic particles such as iron or steel, alone or mixed with particles of other material or liquids, for example graphite and silicon fluids. The amount of magnetic particles in the cylinder should be sufficient to maintain suitable operating quantities in the working gap 15 even at high speeds which have a tendency to spread the magnetic particles by centrifugal force. Suitable seals may be provided at strategic points to ensure containment of the magnetic particles, for example at points 73, 74, 75, 76, 77, 78, and 79.

The shafts 30 and 42 may be interchangeably used as either input or output shafts. For example, shaft 30 may be connected to a prime mover (not shown) and shaft 42 may be connected to a load (now shown) or vice versa.

The alignment of the magnet 54 and its associated structure is such that the travel of the magnet, upon manipulation of the screw 64, is in a direction parallel to the slant line 52 and the working gap 15 formed by the slant line 52 and the inner surface of the cylinder 12.

When the magnet 54 is energized, the gap 15 will be magnetically excited at a zone determined by the position of the magnet 54, and torque will be transmitted between the coupling members 10 and 12 by the magnetic particles in the selected coupling zone. The speed of the output relative to the input will depend upon the ratio between the effective diameters of the coupling members at the selected coupling zone, for example at the position shown in the drawing, the coupling zone selected is indicated at Z and the effective diameter of the cone at that zone is indicated by the arrow-tipped line D. While the effective coupling diameter of the cone will vary depending on the coupling zone selected, the effective coupling diameter of the other coupling member, the cylinder, remains constant and will be the same in all coupling zones. With the screw magnet-positioning means illustrated, an infinite number of magnet positions and resulting coupling zones or points are possible.

The invention, which features controlled variation in the ratio between the effective coupling diameters of two coupling members in a magnetic drive by selective direction of the exciting field at any one of a plurality of coupling zones located along the working gap between two coupling members whose effective diametric ratio varies at different coupling zones, may take various forms and shapes, other than the example described herein, featuring a pair of relatively rotatable coupling members, at least one of which has a plurality of progressively varying effective coupling diameters any one of which may be used by selecting the associated coupling zone.

While the form of embodiment of the invention as herein disclosed constitutes a preferred form, it is to be understood that other forms might be adopted, all coming within the scope of the claims which follow.

What is claimed is as follows:

1. A magnetic drive comprising a pair of relatively rotatable coupling members, means supporting said members for non-coaxial relative rotation, and means for magnetically coupling said members at any one of a plurality of coupling zones including magnetic particles between said members and magnetic means for selectively exciting said particles in any desired zone, the ratio between the diameters of said members differing progressively from zone to zone, at least one of said members having coupling area extending continuously from zone to zone.

2. A magnetic drive comprising a pair of relatively rotatable coupling members mounted to rotate around angularly disposed axes and arranged to define a gap at any one of a plurality of points along a predetermined line, the ratio between the diameters of said members progressively differing from point to point along said line, and at least one of said members having a coupling surface extending continuously along said line through said points, and magnetic means including magnetic particles between said members for selectively coupling said members at any one of said points.

3. A magnetic drive comprising a pair of separate relatively rotatable coupling members spaced along a predetermined line, means for supporting said members for non-coaxial rotation, the diametric ratio between said members progressively differing along said line, and magnetic means including magnetic particles between said members for selectively coupling said members at any one of a plurality of points along said line, at least one of said members having a coupling surface extending continuously along said line through said points.

4. A magnetic drive comprising a pair of spaced relatively rotatable coupling members mounted for rotation about intersecting axes, said members having surfaces adapted to define a magnetic working gap at any one of a plurality of coupling zones, the diametric ratio between said members being variable from zone to zone, and at least one of said members having coupling area extending continuously from zone to zone, and magnetic means including magnetic particles for transmitting torque between said members at any selected one of said zones with a transmission ratio determined by the effective coupling diameters of said members in the selected zone.

5. A magnetic drive comprising a pair of relatively rotatable members supported on non-coaxial shafts and adapted to cooperatively define a gap in a plurality of coupling zones, the effective coupling diameter of at least one of said members being continuously variable from zone to zone, means for transmitting torque between said members including magnetic particles disposed therebetween, and magnetic means for selectively exciting the magnetic particles in any desired zone.

6. A magnetic drive comprising a pair of relatively rotatable coupling members defining a work gap therebetween, means supporting said members for rotation around angularly related axes, magnetic particles disposed in said work gap, the ratio between the effective diameters of said members being variable from zone to zone along the length of said gap, at least one of said members having a coupling area extending continuously through said zones, and magnetic means for selectively exciting any one of a plurality of said zones along said gap to transmit torque between said members at the desired zone with a transmission ratio governed by the ratio between the diameters of the coupling members at the desired zone.

7. A magnetic drive comprising a pair of shafts disposed at an angle to each other, a rotatable driving member on one of said shafts, a rotatable driven member on the other shaft, said members having diverging axes and adjacent coupling surfaces of magnetic material separated by a gap, said surfaces being so related along the length of the gap that the diameter of one member at the gap is different for different points along the gap and increases in substantially stepless manner in a continuous variation from a minimum at one end of the gap to a maximum toward the other end of the gap, magnetic particles disposed in said gap, and means for establishing a magnetic field across any selected portion of said gap thereby causing said particles to transmit torque between said members at the selected point.

8. A magnetic drive comprising a pair of spaced relatively rotatable coupling members arranged to define a magnetic working gap in any one of a plurality of coupling zones, means supporting said members for rotation about diverging axes, magnetic particles for disposition in said gap, the ratio between the diameters of the members being continuously variable from zone to zone, at least one of said members having a coupling surface extending continuously from zone to zone, and means for selectively magnetically exciting the magnetic particles at any desired zone to transmit torque between said members at the desired zone.

9. A magnetic drive comprising a pair of separate rotatable coupling members arranged to be spaced along a predetermined line, means supporting said members for rotation about a non-coaxial axes, the ratio between the effective diameters of said members differing progressively from one part to another part of said line, at least one of said members having a coupling diameter which is continuously variable along said line, magnetic particles between said members for transmitting torque between the members in response to magnetic excitation of the particles, means for selectively magnetically exciting the magnetic particles at any point along said line thereby to couple said members at the desired point with a transmission ratio governed by the diametric ratio between members at the desired point.

10. A magnetic drive comprising a pair of separate coupling members mounted for rotation around angularly related axes having diverging axes, one a cone and the other a cylinder, both being spaced along a predetermined line, magnetic particles between said members, and magnetic means for selectively exciting said particles at any one of a plurality of points along said line thereby to transmit torque between said members at the selected point.

11. A magnetic drive comprising a rotatable hollow cylinder, a rotatable cone located within the hollow portion of said cylinder and arranged to be coupled to said cylinder at any one of a plurality of points, means for supporting said cone and cylinder for relative rotation around angularly disposed axes, and means including magnetic particles for coupling said cone and cylinder at any one of said points.

12. A magnetic drive comprising a pair of separate coupling members supported for relative rotation around divergent axes, one a hollow cylinder, the other a cone located within the hollow of the cylinder, both being spaced along a predetermined line to form a magnetic working gap, magnetic particles disposed in said gap and magnetic means for selectively exciting said particles at any one of a plurality of points along said line, thereby to transmit torque between said members at the selected point, said magnetic means including a magnetizing element disposed externally of said cylinder and adjustable to selectively concentrate a magnetic field through said cylinder at any of said points.

13. A magnetic drive comprising a pair of relatively rotatable coupling members having diverging axes, one member being a hollow cylinder, the other member being located within the hollow of the cylinder and having a conical surface, the inner surface of the cylinder and said conical surface being spaced along a predetermined line to define a gap therebetween, magnetic particles disposed in said gap and magnetic means for selectively exciting said particles at any one of a plurality of points along said lines, thereby to transmit torque between said members at the selected point.

14. A magnetic drive comprising a pair of non-coaxial shafts, a pair of relatively rotatable members carried by the respective shafts and having coupling surfaces defining a gap between said members, one of said surfaces being formed from an infinite number of circles of different diameter, said diametric variation occurring along said gap whereby the ratio between the diameters of said members differs from point to point along said gap, and magnetic means including magnetic particles in said gap for selectively exciting said gap at any desired point to transmit torque between the members at the desired point with a transmission ratio governed by the diameter of the circle forming said one surface at said desired point.

References Cited in the file of this patent

UNITED STATES PATENTS

| Number | Name | Date |
| --- | --- | --- |
| 2,275,404 | Banning | Mar. 10, 1942 |
| 2,548,373 | Hurvitz | Apr. 10, 1951 |

FOREIGN PATENTS

| Number | Country | Date |
| --- | --- | --- |
| 485,591 | Belgium | Nov. 13, 1948 |